United States Patent
Buhl

[11] Patent Number: 5,711,544
[45] Date of Patent: Jan. 27, 1998

[54] AXLE SUSPENSION FOR RIGID AXLES IN VEHICLES

[75] Inventor: Reinhard Buhl, Bohmte, Germany

[73] Assignee: Lemförder Metallwaren AG, Stemwede-Dielingen, Germany

[21] Appl. No.: 776,287
[22] PCT Filed: May 31, 1996
[86] PCT No.: PCT/EP96/02365
§ 371 Date: Jan. 17, 1997
§ 102(e) Date: Jan. 17, 1997
[87] PCT Pub. No.: WO97/00177
PCT Pub. Date: Jan. 3, 1997

[30] Foreign Application Priority Data

Jun. 16, 1995 [DE] Germany .......... 195 21 875.2

[51] Int. Cl.$^6$ .......................................... B60G 9/02
[52] U.S. Cl. .......................... 280/688; 280/689; 280/721
[58] Field of Search ........................... 280/688, 689, 280/721, 700, 703, 717, 725, 726, 723; 267/273

[56] References Cited

U.S. PATENT DOCUMENTS

| | | |
|---|---|---|
| 3,157,242 | 11/1964 | Kozicki ............................ 280/721 X |
| 3,386,752 | 6/1968 | Freers et al. ...................... 280/721 |
| 3,486,575 | 12/1969 | Allison ............................ 280/721 |
| 4,039,205 | 8/1977 | Castanier ......................... 280/721 |
| 4,632,422 | 12/1986 | Csordas et al. ................... 280/689 |
| 4,784,406 | 11/1988 | Stinson ......................... 280/689 X |

Primary Examiner—Christopher P. Ellis
Attorney, Agent, or Firm—McGlew and Tuttle

[57] ABSTRACT

An axle suspension for rigid axles in vehicles, especially utility vehicles, in which at least one longitudinal control arm is arranged on each side of the vehicle approximately at the same level. The control arms extend in the longitudinal direction of the vehicle and connect the vehicle axle vertically movably to the vehicle body. At a different level, a triangle pull rod is articulated to the vehicle axle and to the vehicle body centrally and laterally offset. A stabilizer bar including a torsion spring bar counteracting lateral tilting movements by torsional stresses is also provided. The stabilizer bar is arranged directly between the longitudinal control arms. The ends of the stabilizer bar are connected to the longitudinal control arms in the manner of a universal joint, but rotating in unison.

8 Claims, 2 Drawing Sheets

AXLE SUSPENSION FOR RIGID AXLES IN VEHICLES

FIELD OF THE INVENTION

The present invention pertains to an axle suspension for rigid axles in vehicles, especially utility vehicles, in which at least one longitudinal control arm, which extends in the longitudinal direction of the vehicle and connects the vehicle axle vertically movably to the vehicle body, is arranged on each side of the vehicle approximately at the same level, and, at a different level and a triangle pull rod articulated to the vehicle axle and to the vehicle body centrally and laterally offset, as well as a stabilizer bar consisting of a torsion spring bar counteracting lateral tilting movements by torsional stresses are provided.

BACKGROUND OF THE INVENTION

Axle suspensions have been known, which comprise an axle guiding through longitudinal control arms, which are arranged on both sides of the vehicle and are articulated to the vehicle axle, on the one hand, and to the vehicle body, on the other hand, in conjunction with a triangle pull rod, which is anchored in the center of the vehicle with a central joint, mostly on the vehicle axle, on the one hand, and is articulated on the vehicle body with the ends of its two struts, on the other hand, and a stabilizer bar, whose top view is usually U-shaped, and whose bent leg ends are fastened to the vehicle superstructures in the manner of a limited universal joint at laterally spaced locations from one another, and whose web part is mounted movably around a transverse axis at right angles to the longitudinal direction of the vehicle in at least two stabilizer bearings on the vehicle axle.

SUMMARY AND OBJECTS OF THE INVENTION

The basic object of the present invention is to provide a simpler, space- and cost-saving design of such an axle suspension.

According to the invention, an axle suspension for rigid axles in vehicles, especially utility vehicles, in which at least one longitudinal control arm is arranged on each side of the vehicle approximately at the same level. The control arms extend in the longitudinal direction of the vehicle and connect the vehicle axle vertically movably to the vehicle body. At a different level, a triangle pull rod is articulated to the vehicle axle and to the vehicle body centrally and laterally offset. A stabilizer bar including a torsion spring bar counteracting lateral tilting movements by torsional stresses is also provided. The stabilizer bar is arranged directly between the longitudinal control arms. The ends of the stabilizer bar are connected to the longitudinal control arms in the manner of a universal joint, but rotating in unison.

These design features lead to an integration of the elements for axle guiding and of the elements for the transverse stabilization of the vehicle body in relation to the vehicle axle. The stabilizer bar is arranged directly between the longitudinal control arms for the axle guiding and is connected to these longitudinal control arms by prior-art, low-friction bearing elements rotating in unison, but cardanically movably at right angles to the longitudinal direction of the vehicle. One special advantage of the design according to the present invention is the possibility of replacing already installed axle-guiding elements with an axle suspension designed according to the present invention, using the bearing elements present on the vehicle body and on the vehicle axle.

A separate space is no longer required for the mounting of a stabilizer bar. Bearing elements for the stabilizer bar on the vehicle axle and also on the vehicle body are eliminated. Along with this, the axle suspension according to the present invention also saves costs compared with prior-art designs, because it has fewer individual parts and requires a smaller mount of assembly. However, there also are functional advantages. The stabilizer bar may be used as a straight bar, so that its manufacture is also cheaper. In a preferred embodiment, the ends of the stabilizer bar, designed as a torsion bar, are connected to the longitudinal control arms at least at two points, but movably in the longitudinal direction of the vehicle, so that a connection of the stabilizer bar to the longitudinal control arm that rotates in unison is achieved, but it can be made sufficiently movable in the transverse direction of the vehicle. The stabilizer bar may be arranged between the longitudinal control arms for the axle guiding at any desired point between the articulations of the longitudinal control arms on the vehicle axle and the articulations of the longitudinal control arms on the vehicle body. However, a combination of connecting the stabilizer bar to the longitudinal control arms for the axle guiding with their mounting on the vehicle axle is also possible.

Exemplary embodiments of the present invention are shown partially schematically in the drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
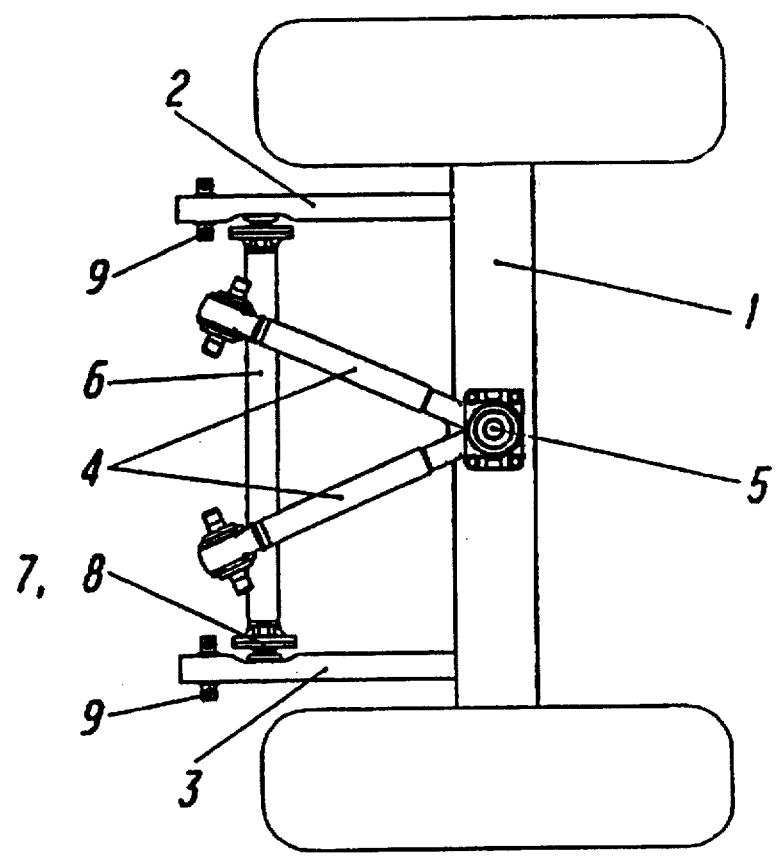
FIG. 1 is a top view of a first exemplary embodiment.

In the exemplary embodiments shown in the drawing, the vehicle axle 1 is connected on both sides of the vehicle by longitudinal control arms 2 and 3 at a considerable distance from the longitudinal center of the vehicle, and in the center of the vehicle, it is connected by a triangle pull rod 4 arranged in a height-adjustable manner to the vehicle body, which is not shown in the drawing for the sake of greater clarity. The joint connections of the longitudinal control arms 2 and 3 to the rigid axle 1, on the one hand, and to the vehicle body, on the other hand, as well as the articulations of the free ends of the two struts of the triangle pull rod 4 are designed cardanically in order to make twisting of the vehicle axle 1 in relation to the vehicle body possible. The triangle pull rod 4 is centrally anchored on the vehicle axle 1 with the central joint 5.

Figure 2:
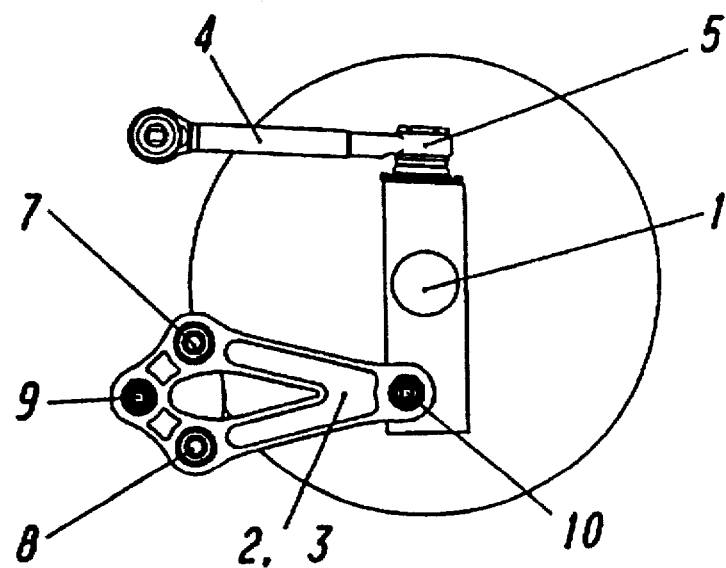
FIG. 2 is a side view of the arrangement according to FIG. 1.

In the exemplary embodiment according to FIGS. 1 and 2, a stabilizer bar 6 is arranged between the longitudinal control arms 2 and 3, and it is connected with its ends to one of the two longitudinal control arms 2 and 3 to rotate in unison, but limitedly movably in the longitudinal direction of the vehicle. This is achieved in the arrangement according to the example shown in FIGS. 1 and 2 by connecting the end of the stabilizer bar to the longitudinal control arms at two points 7 and 8 located at spaced locations from one another, wherein this connection is cardanically movable in order to make possible compensating movements. Ball joints designed as radial joints are preferably used for the articulation. This exemplary embodiment shows the arrangement of the stabilizer bar 6 and its connection to the longitudinal control arms 2 and 3 in the vicinity of the articulation 9 of the two longitudinal control arms 2 and 3 to the vehicle body, not shown.

Figure 3:
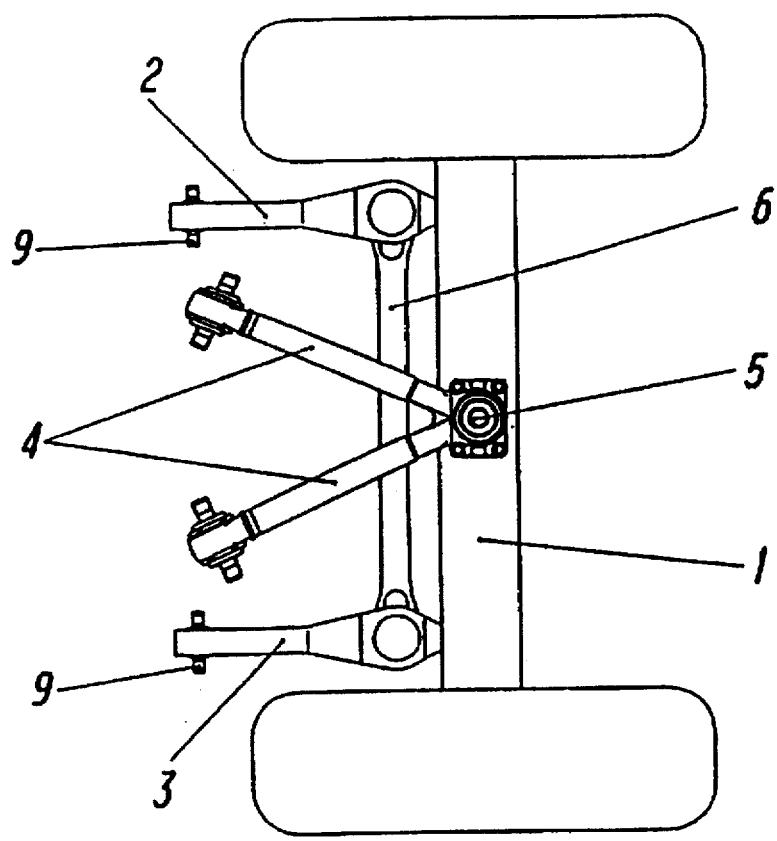
FIG. 3 is a top view of another exemplary embodiment.
Figure 4:
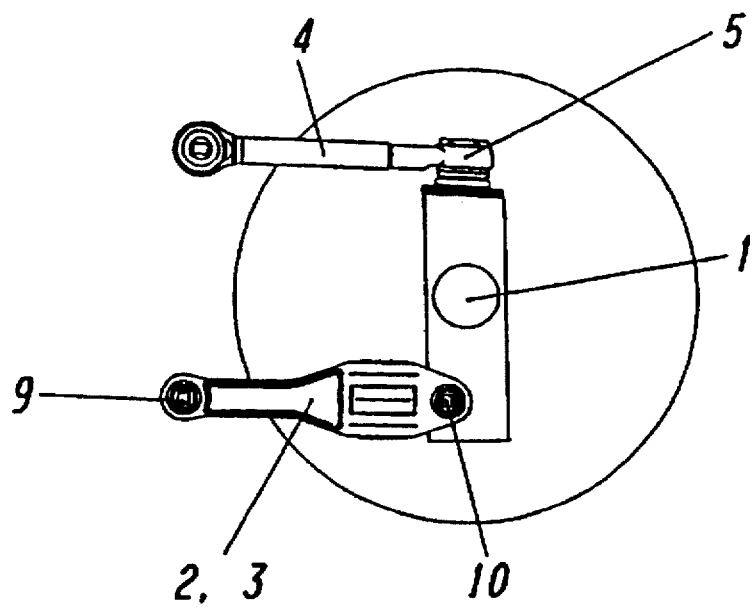
FIG. 4 is a side view of the arrangement according to FIG. 3.

The exemplary embodiment shown in FIGS. 3 and 4 shows a variant in which the stabilizer bar 6 is arranged in the vicinity of the articulations 10 of the other ends of the longitudinal control arms 2 and 3 to the vehicle axle 1. In this exemplary embodiment, the ends of the stabilizer bar 6 engage a complementary recess of the longitudinal control arms 2 and 3 with a polygonal cross-sectional profile in a cardanically movable manner, so that a connection rotating in unison is established.

I claim:

1. An axle suspension for rigid axles in vehicles, comprising:

longitudinal control arms which extend generally in the longitudinal direction of the vehicle and a the vehicle axle vertically movably to the vehicle body, said longitudinal control arms each being connected to the vehicle by an articulation and being connected to the vehicle axle by an articulation and each being arranged on each side of the vehicle approximately at the same level;

a triangle pull rod articulated to the vehicle axle and to the vehicle body centrally and laterally offset, said triangle pull rod being at a different level from said longitudinal control arms;

a stabilizer bar including a torsion spring bar counteracting lateral tilting movements by torsional stresses, said stabilizer bar being arranged directly between said longitudinal control arms, said stabilizer bar including ends which are connected to said longitudinal control arms in the manner of a universal joint, but rotating in unison.

2. Axle suspension in accordance with claim 1 wherein said ends of said stabilizer bar are connected, at least at two points to said longitudinal control arms, movably in relation to the longitudinal direction of the vehicle.

3. An axle suspension in accordance with claim 1 wherein said connection of ends of said stabilizer bar to said longitudinal control arms, which rotate in unison, are each arranged between said articulations on the vehicle body and on said vehicle axle of said longitudinal control arms.

4. An axle suspension in accordance with claim 1 wherein said connection of ends of said stabilizer bar to said longitudinal control arms, which rotate in unison, are each arranged between said articulations on the vehicle body and on said vehicle axle of said longitudinal control arms.

5. An axle suspension for rigid axles in utility vehicles, comprising:

longitudinal control arms which extend generally in the longitudinal direction of the vehicle and are connected to the vehicle axle vertically movably, said longitudinal control arms each being connected to the vehicle by an articulation and each being connected to the vehicle axle by an articulation and each control arm of said longitudinal control arms being arranged on a side of the vehicle approximately at the same level as the other control arm;

a triangle pull rod articulated to the vehicle axle centrally and articulated to the vehicle body laterally offset, said triangle pull rod being at a different level from said longitudinal control arms;

a stabilizer bar including a torsion spring bar counteracting lateral tilting movements by torsional stresses, said stabilizer bar being arranged between said longitudinal control arms, said stabilizer bar including ends which are connected to said longitudinal control arms in the manner of a universal joint, but moving rotationally in unison.

6. An axle suspension in accordance with claim 5 wherein said ends of said stabilizer bar are connected, at least at two points to said longitudinal control arms.

7. An axle suspension in accordance with claim 5 wherein said connection of ends of said stabilizer bar to said longitudinal control arms are each arranged between said articulations on the vehicle body and on said vehicle axle of said longitudinal control arms.

8. An axle suspension in accordance with claim 1 wherein said connection of ends of said stabilizer bar to said longitudinal control arms, which rotate in unison, are each arranged between said articulations on the vehicle body and on said vehicle axle of said longitudinal control arms.

* * * * *